(12) United States Patent
Zahr

(10) Patent No.: US 6,504,004 B2
(45) Date of Patent: Jan. 7, 2003

(54) POLYAMIDE CHAIN EXTENSION PROCESS AND RELATED POLYAMIDE PRODUCT

(75) Inventor: George E. Zahr, Glen Mills, PA (US)

(73) Assignee: E. I. du Pont de Nemours and Company, Wilmington, DE (US)

(*) Notice: Subject to any disclaimer, the term of this patent is extended or adjusted under 35 U.S.C. 154(b) by 0 days.

(21) Appl. No.: 09/757,453

(22) Filed: Jan. 10, 2001

(65) Prior Publication Data

US 2002/0007040 A1 Jan. 17, 2002

Related U.S. Application Data

(60) Provisional application No. 60/176,908, filed on Jan. 20, 2000.

(51) Int. Cl.⁷ .............................................. C08G 69/08
(52) U.S. Cl. ......................................................... 528/310
(58) Field of Search ......................................... 528/310

(56) References Cited

U.S. PATENT DOCUMENTS

| | | |
|---|---|---|
| 2,682,526 A | 6/1954 | Flory |
| 3,365,428 A | 1/1968 | Wujciak |
| 3,730,685 A | 5/1973 | Prohaska |
| 3,763,113 A | 10/1973 | Burrows et al. |
| 3,846,507 A | 11/1974 | Thomm et al. |
| 3,900,676 A | 8/1975 | Alderson |
| 3,944,518 A | 3/1976 | Burrows et al. |
| 4,857,603 A | 8/1989 | Akkapeddi et al. |
| 4,912,175 A | 3/1990 | Wheland et al. |
| 4,966,949 A | 10/1990 | Wheland |
| 5,077,124 A | 12/1991 | Clark, III et al. |
| 5,106,946 A | 4/1992 | Clark, III et al. |
| 5,139,729 A | 8/1992 | Clark, III et al. |
| 5,298,558 A | 3/1994 | Sullivan et al. |
| 5,326,830 A | 7/1994 | Aharibu |
| 5,357,030 A | 10/1994 | VanBuskirk et al. |
| 5,370,935 A | 12/1994 | Agarwal et al. |

FOREIGN PATENT DOCUMENTS

| | | |
|---|---|---|
| EP | 0288253 A | 10/1988 |
| GB | 1 150 725 | 4/1969 |
| JP | 50-64352 | 5/1974 |
| JP | 61-171732 | 8/1986 |
| JP | 63-99228 | 4/1988 |
| JP | 01 197526 A | 8/1989 |
| WO | WO 98/23666 | 6/1998 |
| WO | WO 9847940 A | 10/1998 |

OTHER PUBLICATIONS

Patent Abstracts of Japan, vol. 013, No. 494 (C–651), Nov. 8, 1989.

R. Gutmann, Improvement of polyamide yarn properties by processing polyamide blends, Chemical Fibers Inernational, vol. 46, Dec. 1996, pp. 418–420.

Foster Dee Snell and Leslie S. Ettre, Determination of Polymer Composition, Encyclopedia of Industrial Chemical Analysis, vol. 17, John Wiley & Sons, New York, 1973, pp. 293–294.

*Primary Examiner*—Terressa M. Boykin

(57) ABSTRACT

A process for increasing the relative viscosity (RV) of a reactant polyamide and to products produced by the process. The process includes contacting the reactant polyamide and a chain extender compound, forming the product, and quenching the product when its RV is near its maximum calculated RV value.

11 Claims, 2 Drawing Sheets

POLYAMIDE CHAIN EXTENSION PROCESS AND RELATED POLYAMIDE PRODUCT

BACKGROUND OF THE INVENTION

1. Field of the Invention

This invention relates to processes for increasing the relative viscosity (RV) of a reactant polyamide through the use of chain extender compounds and to polyamide products incorporating chain extender moieties in their polyamide chains.

2. Description of Related Art

Various methods have been proposed to impart high viscosity to polyamides.

Catalysts are employed to speed up the reaction. For example, polyamide 6,6 synthesis involves the reaction of a diamine (hexamethylene diamine) and a diacid (adipic acid) to produce the polyamide 6,6 and water. The rate of formation of the polyamide depends greatly on the removal of water from the reaction system. Catalysts do speed up the reaction but water removal remains the rate determining factor.

Another method to impart a high viscosity to polyamides is referred to as chain extension. Chain extension is based on a reaction between a polyamide chain end group (an acid end group or an amine end group) and a chain extender molecule with two reactive end groups that react with either the amine end group or the acid end group of the polyamide to connect two polyamide chains. Prior use of chain extenders with polyamides did not increase RV enough to adopt the technology. The use of bis-lactams for polyamidation acceleration was disclosed by Flory in U.S. Pat. No. 2,682,526.

There is a need to take low RV polyamide and rapidly increase its RV to a predictable final product with a higher RV.

These and other objects of the invention will be clear from the following description.

SUMMARY OF THE INVENTION

The invention relates to a process for increasing the relative viscosity (RV) of a reactant polyamide, including:

contacting the reactant polyamide and a chain extender compound selected from the group consisting of bis-N-acyl bislactam compounds and mixtures thereof, both in a liquid phase, the reactant polyamide having a starting RV, a concentration of amine end groups (AEG (R)), and a concentration of carboxyl end groups (CEG (R)) with the AEG(R) being greater than the CEG(R), the chain extender compound having a concentration of lactam end groups (LEG) of at least about 10 equivalents per million grams of the reactant polyamide less than the AEG(R), for a duration of about 0.5 minutes to about 10 minutes, increasing the RV of the reactant polyamide;

forming a product, other than flake; and quenching the product to room temperature such that the product has a final RV greater than the starting RV and a concentration of amine end groups (AEG(P)) as defined by the formula:

$$AEG(P)=\{AEG(R)-LEG\}\pm X \qquad (1)$$

wherein:

AEG(P) is the concentration of amine end groups in the quenched product in units of equivalents/1,000,000 gms of the product;

AEG(R) is the concentration of amine end groups in the reactant polyamide in units of equivalents/1,000,000 gms of the reactant polyamide;

LEG is the concentration of lactam end groups in the chain extender compound in units of equivalents/1,000, 000 gms of the reactant polyamide; and X is any number in a range of about 0 to about 5.

The invention is further directed to a product made by the process of the present invention. A preferred product is a filament, comprising:

a synthetic melt spun polymer including:
  polyamide repeating units ($R_1$);
  polyamide chain extender moieties ($R_2$), each independently, selected from the group consisting of bis-N-acyl bislactam moieties; and
  terminal groups ($R_3$), each independently, selected from the group consisting of a hydrogen atom and a hydroxyl group;
the polymer including chains, each independently, having a chemical structure:

$$R_3\text{---}(R_1\text{---}R_2)_y\text{---}R_1\text{---}R_3 \qquad (2)$$

wherein y is an integer of 1–7; and the filament has a formic acid relative viscosity of at least about 30.

BRIEF DESCRIPTION OF THE DRAWINGS

The invention can be more fully understood from the following detailed description thereof in connection with accompanying drawings described as follows.

DESCRIPTION OF THE PREFERRED EMBODIMENT(S)

Figure 1:
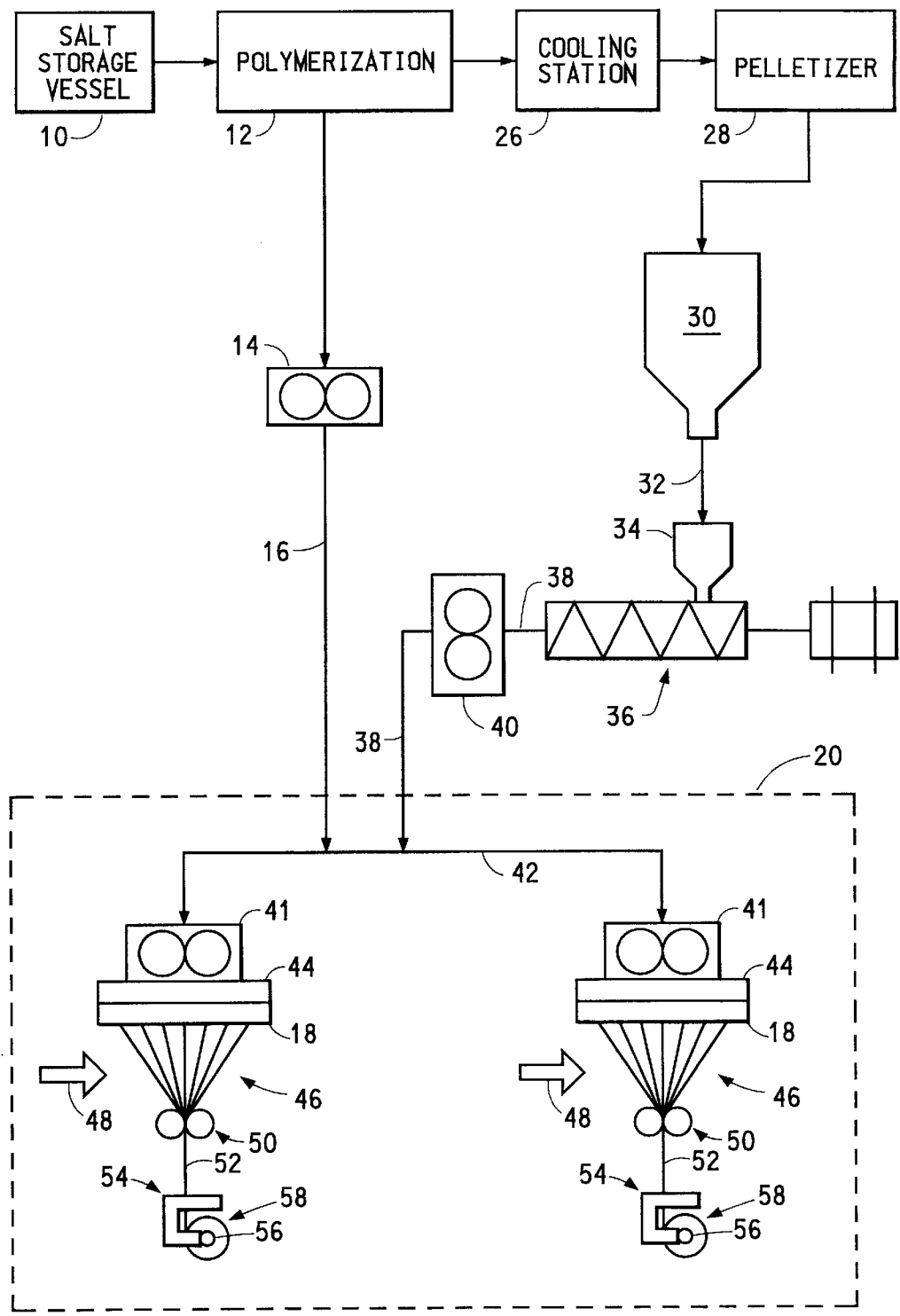
FIG. 1 is a schematic illustrative system that can be used for producing a polyamide filament in accordance with the present invention.

Throughout the following detailed description, similar reference characters refer to similar elements in all figures of the drawings.

I. Process

The invention is directed to a process for increasing the relative viscosity (RV) of a reactant polyamide, comprising the steps of contacting the reactant polyamide and a reactant chain extender compound, forming a product, and quenching the product to room temperature at a reaction non equilibrium state to maintain the polymer at a RV level within a limited defined range from a maximum RV level achieved during the process.

A. Contacting Step

The first step of the process is contacting the reactant polyamide with a chain extender compound, both in a liquid phase.

The contacting step extends for a reaction time period between a time of first contact of the reactant polyamide and the chain extender compound, both in the liquid state, and a time that the formed product is quenched. This reaction time period extends for a duration of about 0.5 minutes to about 10 minutes. If substantially no water and no catalyst is added to or present in the reaction mixture, the reaction time period can be about 10 minutes. By "substantially no water" is meant a water content of about 0.08% to about 0.18%. If either water or a catalyst is added or present, the reaction time period is typically no more than about 4 minutes. If both water and a catalyst are added or present, the reaction time period is typically no more than about 2 minutes.

The contacting step can be performed at a temperature of about 5° C. to about 20° C. above the melting point of the polymer. For example, for nylon 6,6, the temperature can be about 270° C. to about 285° C. The contacting step can be performed at a pressure of about 0.25 psig to about 250 psig depending on the process and polymer used. Preferably, the contacting step is performed while mixing the reactants.

1. Reactant Polymer

The reactant or starting polyamide has a starting RV, a concentration of amine end groups (AEG(R)), and a concentration of carboxyl end groups (CEG(R)) with the AEG (R) being greater than the CEG(R).

Polymers suitable for use as the reactant polyamide in this invention include synthetic melt spinnable polyamide materials have recurring amide groups (—CO—NH—) as an integral part of the polymer chain. The term "polyamide" is used herein to refer to polyamide homopolymers, copolymers, and mixtures.

Illustrative polyamides that can be used in accordance with the invention include poly(hexamethylene adipamide) (i.e., nylon 6,6) homopolymer, poly(e-caproamide) (i.e., nylon 6) homopolymer, polydodecanolactam (i.e., nylon 12) homopolymer, poly(tetramethyleneadipamide) (i.e., nylon 4,6) homopolymer, poly(hexamethylene sebacamide) (i.e., nylon 6,10) homopolymer, the polyamide of n-dodecanedioic acid and hexamethylenediamine (i.e., nylon 6,12) homopolymer, the polyamide of dodecamethylenediamine and n-dodecanedioic acid (i.e., nylon 12,12) homopolymer, copolymers thereof, and mixtures thereof. Illustrative polyamides and copolyamides which can be employed in the process of this invention are those described in U.S. Pat. Nos. 5,077,124, 5,106,946, and 5,139,729 (each to Cofer et al.), each incorporated by reference herein. Illustrative polyamide mixtures which can be employed in the process of this invention are those disclosed by Gutmann in Chemical Fibers International, pages 418–420, Volume 46, December 1996, incorporated by reference herein.

Illustrative polyamides also include copolymers made from a dicarboxylic acid component, such as terephthalic acid, isophthalic acid, adipic acid, or sebacic acid, and a diamine component, such as hexamethylenediamine, 2-methylpentamethylenediamine, or 1,4-bis(aminomethyl) cylcohexane.

The reactant polyamides can be prepared using batch or continuous polymerization methods known in the art. As illustrated in FIG. 1, a suitable method of preparing polyamides is to store a polyamide salt mixture/solution in a salt storage vessel 10. The salt mixture/solution is fed from the storage vessel 10 to a polymerizer 12, such as a continuous polymerizer or a batch autoclave. In the polymerizer 12, the polyamide salt mixture/solution is heated under pressure in a substantially oxygen free inert atmosphere as is known in the art. The polyamide salt mixture/solution is polymerized into molten polymer. When the polymerizer 12 is a continuous polymerizer, the molten polymer can be fed from the continuous polymerizer 12 and conveyed such as by a booster pump 14, through a transfer line 16 to at least a spinneret 18 of at least a spinning machine 20. Alternatively when the polymerizer 12 is a continuous polymerizer, or when the polymerizer 12 is a batch autoclave, the molten polymer can be extruded from the polymerizer 12, for example, in the form of a strands. The extruded polymer strands can be quenched at a cooling station 26, such as in a water bath, into solid polymer strands and fed to a pelletizer 28 which cuts, casts or granulates the polymer into flake. Other terms used to refer to this "flake" include pellets, granulates and particulates. The flake can be any shapes and sizes to be suitable for use in the current invention.

Depending on the end use, the polymer flake can have a formic acid RV of at least about 30 to about 180. This converts to a molecular weight of about 15,000 number average molecular weight to about 25,000 number average molecular weight.

The flake can be fed to a holding vessel or conditioner 30 where the flake can be stored or conditioned, e.g., heated, water added or removed, and/or solid phase polymerized. Flake can be transported through a line 32 to a gravimetric or volumetric flake feeder 34 which is adapted to feed the flake into a melt extruder 36. The flake is melted in the melt extruder 36 and molten polymer is extruded from an outlet of the melt extruder 36 to a transfer line 38. The extruded molten polymer is conveyed, such as by a booster pump 40, through the transfer line 38 to at least a spinneret 18 of at least a spinning machine 20.

Typically, the residence time of the molten polymer in the melt extruder 36 and the transfer line 38 is about 3 to about 15 minutes, and preferably about 3 to about 10 minutes.

2. Chain Extender Compound

Suitable chain extender compounds include bis-N-acyl bislactam compounds and mixtures thereof. Preferred chain extender compounds are bis-N-acyl bis-caprolactam compounds and mixtures thereof. Most preferred chain extender compounds include isophthaloyl bis-caprolactam (IBC), adipoyl bis-caprolactam (ABC), terphthaloyl bis-caprolactam (TBC), and mixtures thereof. The preferred and most preferred chain extender compounds are insensitive to the moisture content of polyamide at the levels of water generally present during polyamidation reactions, are effective over a wide range of starting polyamide RV's, and do not generate by-products.

Chain extender compounds function based on a reaction between a polyamide chain with an acid end group or an amine end group and a chain extender compound with two reactive end groups that react with either the amine end group or the acid end group of the polyamide chain. Chain extender compounds which are bis-N-acyl bislactam compounds react stoichiometrically with the amine end groups of polyamide chains. By this is meant that one lactam end group of a bis-N-acyl bislactam compound reacts with one amine end group of a polyamide chain. This offers final RV and final end group balance predictability. As the amount of chain extender compound is increased, it connects more of the amine end groups of the polyamide chains creating a higher RV polyamide. The maximum RV is reached when the moles of chain extender compound equals half of the equivalents of the amine end groups and all the amine end groups are consumed.

The chain extender compound has a concentration (LEG) of lactam end groups of at least about 10 equivalents per million grams of the reactant polyamide less than the AEG(R). This leaves a concentration (AEG(R)) of amine end groups of at least about 10 equivalents per million grams of the reactant polyamide after the chain extender compound connects the amine end groups of the polyamide chains creating the higher RV polymer. This remaining "at least about 10 equivalents" of amine end groups has been found to be desirable from experimentation to minimize hydrolysis of the higher RV product back to the starting reactants.

The chain extender compound can be added to the melt extruder 36 simultaneously or consecutively with the flake.

In this case, when the flake is melted in the melt extruder 36, molten polymer contacts and reacts with the liquid chain extender compound. Alternatively and, in fact, preferably, the chain extender compound is added to the transfer line 16 or 38 with the molten polyamide. In this case, as soon as the chain extender compound melts, if not already in a liquid phase, it contacts and reacts with the molten polyamide. Preferably when the chain extender compound is added to the transfer line 16 or 38, the chain extender compound is in a liquid phase. Adding the chain extender compound to the extruder 36 or the transfer line 16 or 38 may eliminate the need for the conditioner, or any solid state polymerization vessel, 30 prior to the extruder 36 or the transfer line 38.

In each case, a particularly convenient method for adding the chain extender compound is to provide the chain extender compound in a solution of mixed ingredients including the chain extender compound and a carrier. The purpose for adding the chain extender compound mixed with a carrier is to dilute the chain extender compound to allow a more accurate measurement of the amount of chain extender compound being added. It further enhances dispersal of the chain extender compound in the polyamide. Suitable carriers include low melting (i.e., melts below 150° C.) polyamides, like poly(N,N'-dibutylhexamethylene dodecanediamide) and other polymers that disperses in polyamide, like partially maleated (e.g., 3%) polypropylene, partially maleated (e.g., 3%) polyethylene, and aliphatic polyesters. Preferred carriers are the low melting polyamides.

3. Catalysts

No catalyst is needed in this invention. However, one or more polyamidation catalyst can optionally be added normally to the polymerizer 12 simultaneously or consecutively with the salt mixture/solution, but also to the melt extruder 36 simultaneously or consecutively with the flake and/or to the transfer line 16 or 38 thereby contacting the molten polyamide.

The effect of adding a polyamidation catalyst, in addition to a chain extender compound, is that the catalyst shortens the time between the initial contact time between the molten polyamide and the chain extender compound and the point in time that the resulting product needs to be quenched to room temperature such that the product has a final RV greater than the starting RV and a concentration of amine end groups (AEG(P)) as defined by formula (1) above.

Polyamidation catalysts suitable for use in the process of the invention include phosphonic acids, phosphinic acids, and their derivatives and salts. Suitable illustrative catalysts include those described in U.S. Pat. Nos. 3,365,428; 3,763,113; 3,944,518; 4,912,175; 4,966,949, each incorporated herein by reference, and references cited therein. Of these, the preferred catalysts are phenylphosphonic acid and 2-(2'-pyridyl)ethylphosphonic acid.

An effective amount of the catalyst(s) is added. Generally the catalyst is added to the polymerizer 12 in an amount from about 0.25 moles up to about 5 moles per million grams, mpmg, of polyamide (typically about 50 ppm to 1,000 ppm based on the polyamide). Preferably, the catalyst is added in an amount of about 0.4 moles to about 0.8 moles per million grams, mpmg, of polyamide (about 80 ppm to 160 ppm based on the polyamide). This range provides commercially useful rates of polymerization during initial polymerization and/or after remelting the polymer in the form of flake such as in the extruder 36 and/or the transfer line 16 or 38 under the conditions of the current invention, while minimizing deleterious effects which can occur when catalyst is used at higher levels, such as pack pressure rise during subsequent spinning.

A particularly convenient method for adding the polyamidation catalyst is to provide the catalyst in a solution of polymer ingredients in which polymerization is initiated, e.g., by addition to a salt solution, such as the hexamethylene-diammonium adipate solution used to make nylon 6,6.

Instead of or in addition to one or more liquid phase polyamidation catalyst, one or more solid state polymerization catalyst can optionally be added, such as disclosed in International Patent Application WO 98/23666, herein incorporated by reference in its entirety.

Catalysts employed in prior art polyamide production processes are generally not effective at increasing polyamide RV where the starting polyamide has an RV below 30 and most are not effective where the starting polyamide has an RV below 45. When a catalyst and a chain extender compound is added in accordance with this invention, the RV of the reactant polyamide can be as low as about 4 where the chain extender compound is effective at increasing the polyamide RV until the polyamide RV is high enough for both the chain extender and the catalyst to become effective at increasing its RV.

4. Additives

Usual amounts of additives as are known in the art can be added to the polyamide in the process of this invention. They can be added when the chain extender compound is contacted with the polyamide or before. For example, typical additives include plasticizers, delustrants, pigments, dyes, light stabilizers, heat and/or oxidation stabilizers, antistatic additives for reducing static, additives for modifying dye ability, agents for modifying surface tension, etc.

The molten polymer in the transfer line 16 or 38 and flake in the conditioner 30 can contain variable amounts of absorbed water. Water can also be added to the conditioner 30 or the melt extruder 36 as a control on the final RV of the product. The addition of water reduces the RV of the product.

B. Forming Step

During the contacting step, the reactant polyamide and the chain extender compound react forming a modified polyamide having a higher RV than the RV of the reactant polyamide.

After the contacting step, a product, other than flake, is formed from the modified polyamide. As with polyamide that was used prior to this invention to make product, the modified polyamide of this invention must have a molecule weight suitable for use in forming the desired end product. For instance, when the product is a filament, the modified polyamide must be of filament-forming molecular weight in order to melt spin into filaments. For most end uses, including the production of filaments, the modified polyamides can have any molecular weight distribution.

Products that can be made by the process of the invention include spun articles (e.g., filaments), blow molded articles (e.g., bottles), extruded articles (e.g., films), and injection molded shaped articles.

Referring again to FIG. 1, preferably, the article is formed by spinning the polyamide into at least one filament 46. Metering pumps 41 can be used to force the molten polymer from a manifold 42 connected to the transfer line 16 or 38 through spin filter packs 44 and then the spinnerets 18, each having a plurality of capillaries through the spinneret 18 thereby spinning the molten polymer through the capillaries into a plurality of filaments 46.

C. Quenching Step

Then the product is quenched to room temperature such that the product has a final RV greater than the starting RV and a concentration of amine end groups (AEG(P)) as defined by the formula:

$$AEG(P) = \{AEG(R) - LEG\} \pm X \quad (1)$$

wherein:

AEG(P) is the concentration of amine end groups in the quenched product in units of equivalents/1,000,000 gms of the product;

AEG(R) is the concentration of amine end groups in the reactant polyamide in units of equivalents/1,000,000 gms of the reactant polyamide;

LEG is the concentration of lactam end groups in the chain extender compound in units of equivalents/1,000, 000 gms of the reactant polyamide; and X is any number in a range of about 0 to about 5.

The filaments 46 from each spinneret 18 are quenched typically by an air flow (illustrated in FIG. 1 by arrows 48) transverse to the length of the filaments 46. The filaments 46 can then be converged by a convergence device 50 into a yarn and wound by a wind-up device 54, for instance, on a tube 56 into a package 58.

The resulting filaments 46 can be made into yarns 52 and fabrics for a variety of applications well know in the art. The product formed by the process of the invention can be subsequently processed as long as it is not remelted in such process steps. For instance, after being formed, filaments 46 can be subsequently drawn, textured, crimped, and/or cut, etc., all as known in the art.

When chain extender compounds were used with polyamides prior to this invention, it was not appreciated that the product needed to be quenched in a non equilibrium state as per formula (1) above to freeze the polymer in its chain extended state retaining the high RV achieved by adding the chain extender compound. It is believed that the reason the product needs to be quenched per formula (1) above is that the addition of the chain extender compound appears to shift the polyamide reaction away from its equilibrium state.

This can be explained in reference to the following schematic polyamide (i.e., nylon 6,6) chemical reaction wherein one reactant (i.e., hexamethylenediamine ($H_2N$—$(CH_2)_6$—$NH_2$)) has an amine end group (—$NH_2$) and another reactant (i.e., adipic acid (HOOC—$(CH_2)_4$—COOH)) has an acid group (—COOH) and the products comprise polyamide chains with multiple amide groups (—NHCO—) along its chains and water ($H_2O$).

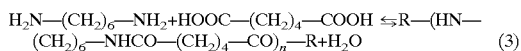

(3)

where

R is H or OH; and n is about 10 to about 150.

This reaction continues until an equilibrium is established between the reactants and the products. This equilibrium can be expressed by the following equation.

$$K_{eq} = [-NHCO-][H_2O]/[-NH_2][-COOH] \quad (4)$$

where $K_{eq}$ is a constant;

[—NHCO—] is the concentration of amide groups;

[$H_2O$] is the concentration of water;

[—$NH_2$] is the concentration of free amine end groups; and

[—COOH] is the concentration of free acid end groups.

However, when a bis-N-acyl bislactam compound is added to the reaction mixture, a pair of amine end groups is consumed by each of the bis-N-acyl bislactam molecules. This decreases the concentration of amine end groups, increases the number of amide groups increasing the polymer RV, with no change in acid end groups and water.

Figure 2:
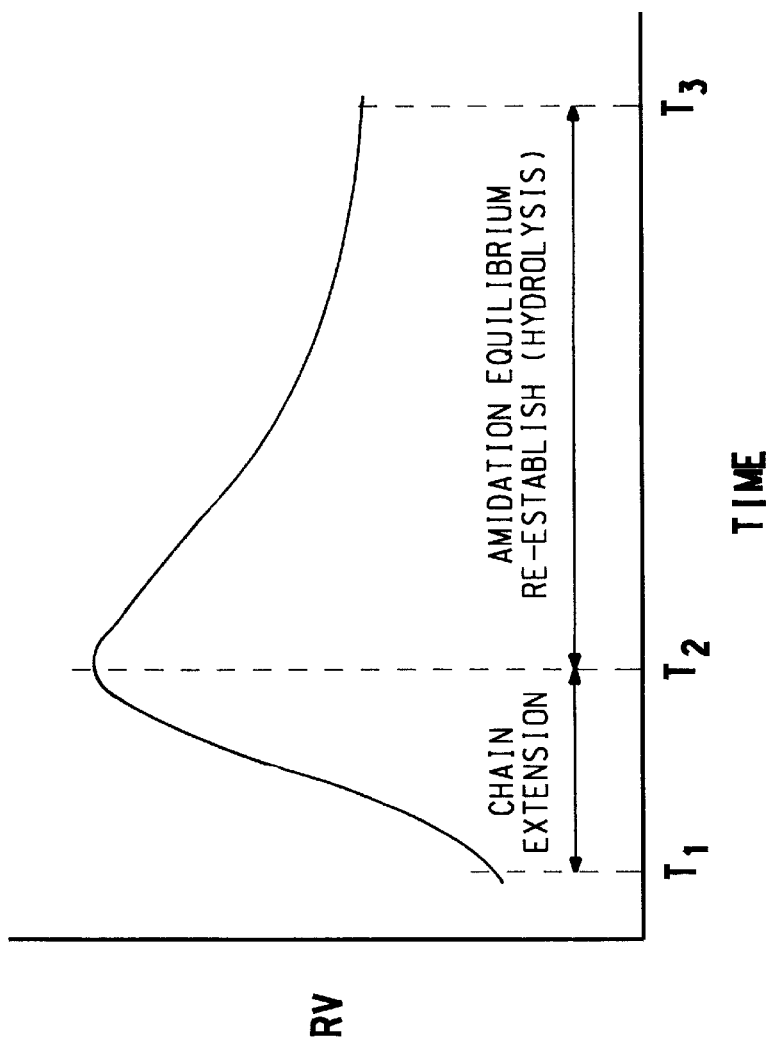
FIG. 2 is a graph showing a schematic representation of relative viscosity versus time for a reaction to produce nylon 6,6 utilizing a chain extender compound.

This is illustrated in FIG. 2 which is a graph of RV versus time. At time $T_1$, chain extender compound is contacted with polyamide 6,6 and/or reactants for producing polyamide, all in liquid state. The ingredients rapidly react to a point at time $T_2$ where the RV has increased to a maximum possible value which surprisingly is not the equilibrium state. It was surprisingly discovered that if the polymer is kept in a liquid state and the product is not quenched to stop the reaction, with time the polyamide will react with water (hydrolyze) back to its equilibrium state generating more amine end groups and acid end groups, and fewer amide groups and a lower RV, as illustrated at time $T_3$ in FIG. 2. See FIG. 2. Clearly this results in less than optimum effectiveness of the chain extender compound. Similarly, if product is quenched according to the invention, but is subsequently remelted, water in the mixture will drive the reaction back to an equilibrium state with the lower RV illustrated at time $T_3$ in FIG. 2. The rate of the hydrolysis part of the curve depends on temperature, moisture content, and the presence of an amidation catalyst.

The invention recognizes that the desired product must be quenched to room temperature to maintain the polymer at a RV level within a limited defined range from its maximum RV level to retain the benefit of the high RV produced by the addition of the chain extender compound. This is captured by formula (1). In formula (1), AEG(P) is the actual or measured concentration of amine end groups in the quenched product. The difference between the concentration of amine end groups in the reactant polyamide and concentration of the lactam end groups in the chain extender compound, {AEG(R)-LEG}, is the theoretical or calculated amine end group concentration that would result from a stoichiometric reaction between the chain extender compound and the polyamide. Formula (1) requires that the product be quenched when the actual or measured amine end group concentration in the polyamide product, AEG(P), is within a deviation factor, X, which is plus or minus 5 amine end groups/million grams of polyamide of the theoretical or calculated amine end group concentration that would result from a stoichiometric reaction between chain extender compound and the polyamide. As such, deviation factor X can be any number in a range of about 0 to about 5. Preferably, X is any real number in a range of about 0 to about 2. As used herein, the term "number" means any real number including integers and fractions.

II. Product

The invention is further directed to a product made by the process of the invention. Preferably, the product comprises a filament which comprises a synthetic melt spun polymer including:

polyamide repeating units ($R_1$);

polyamide chain extender moieties ($R_2$), each independently, selected from the group consisting of bis-N-acyl bislactam moieties; and terminal groups ($R_3$), each independently, selected from the group consisting of a hydrogen atom and a hydroxyl group;

the polymer including chains, each independently, having a chemical structure:

$$R_3-(R_1-R_2)_y-R_1-R_3 \quad (2)$$

wherein y is an integer of 1–7; and the filament has a formic acid relative viscosity of at least about 30.

Suitable polyamide repeating units ($R_1$), each independently, can be selected from the group consisting of (i) —{$CO(CH_2)_k$—$CONH$—$(CH_2)_m NH$}$_n$—, where k and m, each independently, is an integer of 1–12, and n is an integer of 10–140, and (ii) —{$NH(CH_2)_x$—$CO$}$_z$— where x is an integer of 1–12 and z is an integer of 20–280. In formula (i), when k=4 and m=6, the formula represents a repeating unit of nylon 6,6. In formula (ii), when x=5, the formula represents a repeating unit of nylon 6.

Suitable polyamide chain extender moieties ($R_2$), each independently, can be selected from the group consisting of bis-N-acyl bis-caprolactam moieties. Preferably, $R_2$, each independently, is selected from the group consisting of an isophthaloyl bis-caprolactam (IBC) moiety, an adipoyl bis-caprolactam (ABC) moiety, and a terphthaloyl bis-caprolactam (TBC) moiety.

Other products of the invention would be produced utilizing the reactants disclosed herein and/or following the processes described herein.

Advantages

This invention enables higher capital productivity, lower manufacturing cost, and greater process flexibility than prior methods for manufacturing high RV polyamides. The chain extension process of the invention is very rapid and occurs in minutes or seconds as opposed to hours as in prior art methods. Because of the rapid chemistry of chain extension, higher RV polymer can be made without exposing the polymer to long periods of high temperature and thus minimizes oxidation and branching.

DEFINITIONS AND TEST METHODS

Unless otherwise described, the following test methods were used throughout this specification to determine the following items. Relative viscosity or formic acid relative viscosity (RV) of polyamides as used herein refers to the ratio of solution and solvent viscosities measured in a capillary viscometer at 25° C. The solvent is formic acid containing 10% by weight of water. The solution is 8.4% by weight polyamide polymer dissolved in the solvent. This test is based on ASTM Standard Test Method D 789. Actual or measured concentration of amine end groups (AEG) can be determined by the following steps. Weigh exactly 1.000 gms of a dry ground polyamide sample and place it in a cup equipped with a magnetic stirrer. Add 70 ml of 85/15 by volume of phenol/methanol (menol) solution to the cup. Cap it and stir until the sample is dissolved. Titrate the polyamide-menol solution with 0.025N perchloric acid ($HClO_4$) in methanol using an automatic titrater. 70 ml of pure menol solution (blank) is titrated the same way. The concentration of amine end groups (AEG) is then determined using the following formula:

$$\text{amine end groups } (AEG)=(A-B)(N)(1000)/(W) \qquad (5)$$

where

A=ml of $HClO_4$ solution to titrate the polyamide-menol solution.

B=ml of $HClO_4$ solution to titrate the blank.

N=Normality of $HClO_4$ solution in equivalents per liter.

W=Weight of polyamide sample in gms.

The units of AEG is equivalents of amine end groups per 1,000,000 gms of polyamide polymer. AEG(R) refers to the amine end groups of the starting or reactant polyamide. Whereas, AEG(P) refers to the amine end groups of the product polyamide, i.e., the quenched article.

Actual or measured concentration of carboxyl end groups (CEG) can be determined by the following steps. Weigh exactly 3.000 gms of a dry ground polyamide sample and place in a cup equipped with a magnetic stirrer. Add 100 ml of benzyl alcohol to the cup. Cap it and stir with heat until the sample is dissolved. Using phenolphthalein indicator, titrate the content of the beaker with a standard 0.1 N potassium hydroxide (KOH) aqueous solution. 100 ml of pure benzyl alcohol (control) is titrated the same way. The concentration of carboxyl end groups (CEG) is then determined using the following formula:

$$\text{carboxyl end groups } (CEG)=(A-B)(N)(1000)/(W) \qquad (6)$$

where

A=ml of KOH solution to titrate the polyamide solution.

B=ml of KOH solution to titrate the blank.

N=Normality of KOH aqueous solution in equivalents per liter.

W=Weight of polyamide sample in gms.

The units of CEG is equivalents of carboxyl end groups per 1,000,000 gms of polyamide polymer. CEG(R) refers to the carboxyl end groups of the starting or reactant polyamide. Whereas, CEG(P) refers to the carboxyl end groups of the product polyamide, i.e., the quenched article.

Similar suitable methods for determining AEG and CEG are described in The Encyclopedia of Industrial Chemical Analysis, Vol. 17, John Wiley & Sons, New York, 1973, p. 293–294, and U.S. Pat. No. 3,730,685, both incorporated by reference herein.

Actual or measured concentration of lactam end groups (LEG) can be determined based on the weight of the biscaprolactam chain extender compound used by the following formula:

$$\text{lactam end groups } (LEG)=(2)(W'/M)(1000,000)/(W) \qquad (7)$$

where

W'=Weight of biscaprolactam chain extender compound in gms.

M=Molecular weight of biscaprolactam chain extender compound

W=Weight of polyamide sample in gms.

The units of LEG is equivalents of lactam end groups per 1,000,000 gms of polyamide polymer.

All parts and percentages are by weight based on total weight unless otherwise indicated.

EXAMPLES

This invention will now be illustrated by the following specific examples. Examples prepared according to the process of the current invention are indicated by numerical values. Control or Comparative Examples are indicated by letters.

Synthesis of Chain Extender Compounds

The adipoylbiscaprolactam (ABC) chain extender compound used in the following examples was prepared by dissolving 136 grams of caprolactam (1.2 moles) in 500 ml tetrahydrofuran (THF) in a 2 liter Erlenmeyer flask, cooling the resulting solution in an ice bath to below 5° C., and slowly adding 100 grams of adipoyl chloride (0.55 mole) with stirring. The temperature was maintained below 5° C. 200 ml of pyridine was added to the stirred solution to form a precipitate of ABC and pyridinum chloride. The mixture was stirred for ½ hour below 5° C., then heated to boiling for 30 minutes, followed by pouring the hot solution into a 3 gallon (13.5 liter) bucket half filled with a 50/50 mixture of water and ice with vigorous stirring. The ABC precipitates and all other ingredients stay in solution. Solid ABC (155.8 grams) was collected by suction filtration.

The isophthaloylbiscaprolactam (IBC) was prepared by the same method as the ABC except that the 100 gms of adipoyl chloride was replaced by 112 gms of isophthaloyl chloride.

The terephthaloylbiscaprolactam (TBC) was prepared by the same method as the ABC except that the 100 gms of adipoyl chloride was replaced by 112 gms of terephthaloyl chloride.

Examples 1–3

These Examples demonstrate that as a reactant polyamide (i.e., nylon 6,6 homopolymer) is contacted with varying amounts of a chain extender compound (i.e., Adipoylbiscaprolactam (ABC)), the greater the amount of chain extender compound added, the higher the product RV, more amine end groups are consumed, and in each case the reactions satisfy formula (1).

In Examples 1, 2 and 3, nylon 6,6 homopolymer was used as the starting or reactant polyamide. The nylon 6,6 homopolymer was prepared from an aqueous solution of adipic acid/hexamethylene diamine salt, using 0.56 wt % excess hexamethylenediamine, without addition of catalyst, using standard autoclave methods. This amine end rich nylon 66 had a RV of 37.9, an AEG(R) of 97.5 equivalents/million grams of polyamide, and a CEG(R) of 53 equivalents/million grams of polyamide.

Adipoylbiscaprolactam (ABC) was added to 6.00 gms of the nylon 6,6 homopolymer and mixed well in the solid state in a test tube. The amount of ABC added increased in Example 2 with respect to Example 1 and increased in Example 3 with respect to Example 2. The tube had a small wire stirrer, covered with a stopper and was blanketed with nitrogen. The test tube was inserted in a molten metal bath at 286° C. for a period of 4 minutes, followed by quenching the tube in a room temperature water bath. The polymer was removed from the tube and tested. Table 1 shows for each Example (1) the weight of ABC used, (2) the lactam end group concentration (LEG) based on ABC weight, (3) the determined value of RV, (4) the actual or measured value of the amine end group concentration (AEG(P)) of the product nylon, (5) the calculated or theoretical amine end group concentration (Calculated AEG(P)) of the product nylon based on a stoichiometric reaction of amine end groups of the reactant nylon and the lactam end groups of the ABC, and (6) deviation factor X as defined in formula (1).

Example A

The procedure of Example 1 was followed using the same materials, equipment and conditions, except no ABC chain extender compound was added. Table 1 shows the product RV, and the product AEG(P) for this Example A.

TABLE 1

| Example | ABC (gms) | ABC LEG | RV | Measured Product Nylon AEG(P) | Calculated AEG(P) (AEG(R)-LEG) | X |
|---|---|---|---|---|---|---|
| A | 0 | 0 | 42.7 | 88.3 | NA* | NA |
| 1 | 0.045 | 44.6 | 56.4 | 52.7 | 52.9 | −0.2 |
| 2 | 0.060 | 59.5 | 72.3 | 34.9 | 38.0 | −3.1 |
| 3 | 0.075 | 74.4 | 92.0 | 23.9 | 23.1 | +0.8 |

*NA means not applicable. When no chain extender compound is added, there is no LEG.

Examples 4 and 5

These Examples show that when different reactant polymers with different starting RVs are contacted with a chain extender compound, that resulting products have RVs higher than the reactant polymers, with fewer amine end groups, and in each case the reactions satisfy formula (1). These Examples also show the use of isophthaloylbiscaprolactam (IBC) as a chain extender compound.

The starting polymer used in Example 4 is the same amine rich nylon 6,6 homopolymer used in Example 1. The starting polymer used in Example 5 was an amine rich nylon 6,6 homopolymer which was synthesized in an identical method to the one used in Example 1, except a 2 wt % excess of hexamethylenediamine was used. The nylon 6,6 used in Example 5 had an RV=17.1, an AEG(R)=244 and a CEG (R)=16.

Otherwise, the same procedure used in Example 1 was applied in these Examples, except that ABC was replaced with isophthaloylbiscaprolactam (IBC).

Table 2 shows (1) the determined RV, (2) the amine end group concentrations (AEG(R)) of the reactant nylons, (3) the weights of IBC used, (4) the caprolactam end group concentrations based on IBC weight (LEG), (5) the measured RVs, (6) the actual or measured amine end group concentrations (AEG(P)) of the product nylon, (7) the calculated amine end group concentrations (Calculated AEG (P)) based on a stoichiometric reaction of amine end groups of reactant nylon and IBC, and (7) deviation factor X as defined in formula (1).

TABLE 2

| | Reactant Nylon | | IBC | IBC | Measured Product Nylon | | Calculated AEG(P) (AEG(R)- | |
|---|---|---|---|---|---|---|---|---|
| Ex | RV | AEG(R) | gms | (LEG) | RV | AEG(P) | LEG) | X |
| 4 | 37.9 | 97.5 | 0.045 | 42.1 | 52.6 | 52.7 | 55.4 | −2.7 |
| 5 | 17.1 | 244.0 | 0.090 | 84.3 | 27.3 | 161.2 | 159.7 | +1.5 |

Examples 6–8

These Examples show that when a reactant polymer (i.e., nylon 6,6 homopolymer) is contacted with varying amounts of IBC, added with a carrier, as the chain extender compound in a commercial setting in a spinning machine varying the dryness of the reactant polymer and the amount of chain extender that resulting products have RVs higher than the reactant polymers, with fewer amine end groups, and in each case the reactions satisfy formula (1).

Nylon 6,6 homopolymer for Examples 6–8 was prepared in an autoclave from an aqueous solution of adipic acid/hexamethylenediamine salt containing 0.5 wt % excess hexamethylenediamine (to generate amine-rich nylon 6,6), 50 ppm of "Dow Conning Antifoam B", an antifoaming agent, and 16 ppm of manganous hypophospite, an antioxidant. The homopolymer had a RV of 40, an AEG(R) of 97 equivalents per million grams of polymer, and a CEG(R) of 54 equivalents per million grams of polymer. The homopolymer was pelletized into flake.

The nylon 6,6 homopolymer flake was fed to a twin screw extruder of a spinning machine that was equipped with a transfer line to the spinneret as described in U.S. Pat. No. 5,370,935, herein incorporated by reference. For Example 8, the nylon flake of Example 6 was used and the polymer flake was exposed to nitrogen gas at 105° C. as the flake was fed from the conditioner to the extruder to dry the flake prior to feeding into the extruder. The temperature in the transfer line was 288° C. Mixing was provided by a series of in-line Koch and Kenics static mixers.

A chain extender compound concentrate of 40 wt % IBC and 60% a low molecular weight (Mw approximately 3500)

polyamide carrier was prepared. The carrier was poly(N,N'-dibutylhexamethylene dodecanediamide) synthesized from N,N'-dibutylhexamethylene, dodecanediamide and stearic acid as end caps prepared using the method described in U.S. Pat. No. 3,900,676, herein incorporated by reference. The chain extender compound concentrate was injected into the transfer line at a fixed rate such that predetermined concentrations of the chain extender compound in the total reactants is achieved. Polymer residence time in the transfer line between the injection point and the spinneret was approximately 1 minute and 30 seconds.

Table 3 shows for each of these Examples (1) the drying condition of the starting polymer, (2) the IBC concentration, (3) the caprolactam end group concentration (LEG) based on injection rate of the IBC concentrate, (4) the determined RV, (5) the actual or measured amine end group concentrations (AEG(P)) of the product nylon fiber, (6) the calculated amine end group concentrations (Calculated AEG(P)) based on a stoichiometric reaction of amine end groups of the starting nylon and the IBC in the transfer line, and (7) deviation factor X as defined in formula (1).

Example B

This is a comparative example where the procedure is the same as in Example 6, except that no IBC concentrate was injected into the transfer line. Relevant process variables and properties are listed in Table 3.

Example C

This is a comparative example where the procedure is the same as in Example 6, except that a pure polyamide carrier without IBC was injected into the transfer line at a rate of 1% by weight. Other relevant process variables and properties are listed in Table 3.

TABLE 3

| Ex | Polymer Dryness | WT % IBC Concentrate | IBC (LEG) | Measured Product Nylon RV | AEG(P) | Calculated AEG(P) (AEG(R)-LEG) | X |
|---|---|---|---|---|---|---|---|
| 6 | As received | 1.25% | 28.1 | 52.1 | 70.5 | 68.9 | +1.6 |
| 7 | As received | 2.50% | 56.2 | 74.7 | 40.6 | 40.8 | −0.2 |
| 8 | Dry | 1.25% | 28.1 | 56.1 | 69.0 | 68.9 | +0.1 |
| B | As received | 0 | 0 | 40.8 | 96.7 | NA | NA |
| C | As received | 0 | 0 | 40.9 | 97.5 | NA | NA |

Examples 9–11

These Examples show that starting polymers that have RVs higher than starting polymers of other Examples when contacted with the chain extender compound IBC in a commercial setting in a spinning machine results in products that have RVs even higher than the high RV reactant polymers, with fewer amine end groups, and in each case the reactions satisfy formula (1).

The same conditions, equipment and materials used in Example 6 were used in Examples 9–11, except that the nylon 6,6 flake was solid phase polymerized before being fed to the extruder of the spinning machine and the injection rate of the IBC concentrate varied. The flake was solid phase polymerized by exposing the flake to a circulating nitrogen gas at 150° C. for 16 hours. The solid phase polymerized nylon flake had an RV=78.3, an AEG(R)=75.8 and a CEG(R)=35.1.

Table 4 shows for each of these Examples (1) the injection rate of the IBC concentrate, (2) the caprolactam end group concentrations (LEG) based on injection rate of the IBC concentrate, (3) the determined RV, (4) the actual or measured amine end group concentrations (AEG(P)) of the product nylon fiber, (5) the calculated amine end group concentrations (Calculated AEG(P)) based on stoichiometric reaction of the amine end groups of the reactant nylon and the IBC in the transfer line, and (6) deviation factor X as defined in formula (1).

TABLE 4

| EX | Weight % IBC Concentrate | IBC (LEG) | Measured Final Nylon RV | AEG(P) | Calculated AEG(P) (AEG(R)-LEG) | X |
|---|---|---|---|---|---|---|
| 9 | 0.425% | 9.6 | 93.7 | 65.8 | 66.2 | −0.4 |
| 10 | 0.85% | 19.1 | 103.2 | 59.7 | 56.7 | +3.0 |
| 11 | 1.25% | 28.1 | 116.3 | 50.7 | 47.7 | +3.0 |

Example 12

This Example shows that a nylon 6,6 copolymer contacting terephthaloylbiscaprolactam (TBC) as the chain extender compound results in a product with a RV higher than the reactant polymer, with fewer amine end groups, with the reaction satisfying formula (1).

A nylon 6,6 copolymer was prepared the same way as the nylon 6,6 homopolymer in Example 1, except that 5 mole % of the hexamethylenediamine was replaced by the same number of moles of 1,4-bis(methylamine)cyclohexane. The nylon 6,6 copolymer produced had a RV=41.6, an AEG(R)= 122.9 and a CEG(R)=42.8.

0.06 gm of terephthaloylbiscaprolactam (TBC) was added to 6.00 gms of the nylon 6,6 copolymer. This was mixed, heated and quenched as described in Example 1. The produced copolymer was removed from the tube and tested.

Table 5 shows (1) the weight of TBC used, (2) the caprolactam end group concentrations (LEG) based on TBC weight, (3) the determined values of RV, (4) the actual or measured amine end group concentrations (AEG(P)) of the product nylon, (5) the calculated amine end group concentrations (Calculated AEG(P)) based on a stoichiometric reaction of the amine end groups of the reactant nylon and the TBC chain extender compound, and (6) the deviation factor X as defined in formula (1).

Example D

This is a comparative example where the example weight, procedure and conditions are the same as Example 12, except that no TBC chain extender compound was added. Relevant process variables and properties are listed in Table 5.

TABLE 5

| EX | TBC gms | IBC (LEG) | Measured Product Nylon RV | AEG(P) | Calculated AEG(P) (AEG(R)-LEG) | X |
|---|---|---|---|---|---|---|
| 12 | 0.06 | 56.2 | 94.8 | 67.9 | 66.7 | +1.2 |
| D | 0.0 | 0 | 43.1 | 118.2 | NA | NA |

Examples 13–15

These Examples show that a nylon 6 copolymer contacted with IBC as the chain extender compound and as the amount of chain extender compound is increased, results in a product with higher RV than the reactant copolymer with more amine end groups are consumed, and the reactions satisfying formula (1).

Nylon 6 copolymer used in Examples 13–15 was prepared from caprolactam and 0.59% by weight hexamethylenediamine in an autoclave to produce amine end rich nylon 6. The produced nylon 6 was pelletized into flake which was rinsed with water to remove unreacted caprolactam. The polymer flake had a RV=20.0, an AEG(R)=106.6 equivalents/million grams of polymer and a CEG(R)=57.1 equivalents/million grams of polymer.

The same procedure as Example 1 was used, except the nylon 6 flake was used in place of the nylon 6,6 flake and IBC was used in place of ABC.

Table 6 shows for each of these Examples (1) the weight of IBC used, (2) the caprolactam end groups concentration (LEG) based on IBC weight, (3) the determined values of RV, (4) the actual or measured amine end group concentrations (AEG(P)) of the product nylon, (5) the calculated amine end group concentrations of the product nylon (Calculated AEG(P)) based on a stoichiometric reaction of amine end groups of reactant nylon 6 and the IBC chain extender compound, and (6) the deviation factor X.

Example E

This is a comparative Example where the example weight, procedure and conditions are the same as Example 13, except that no IBC chain extender compound was added. Process variables and resulting data are in Table 6.

TABLE 6

| EX | ABC Gms | ABC (LEG) | Measured Product Nylon RV | Measured Product Nylon AEG(P) | Calculated AEG(P) (AEG ®-LEG) | X |
|---|---|---|---|---|---|---|
| 13 | 0.03 | 28.1 | 27.2 | 77.0 | 78.5 | -1.5 |
| 14 | 0.045 | 42.1 | 31.0 | 65.2 | 64.5 | +0.7 |
| 15 | 0.06 | 56.2 | 41.4 | 49.8 | 50.4 | -0.6 |
| E | 0.0 | 0 | 20.4 | 104.5 | NA | NA |

Those skilled in the art, having the benefit of the teachings of the present invention as hereinabove set forth, can effect numerous modifications thereto. These modifications are to be construed as being encompassed within the scope of the present invention as set forth in the appended claims.

What is claimed is:

1. A process for increasing the relative viscosity (RV) of a reactant polyamide, comprising:

contacting the reactant polyamide and a chain extender compound selected from the group consisting of bis-N-acyl bislactam compounds and mixtures thereof, both in a liquid phase, the reactant polyamide having a starting RV, a concentration of amine end groups (AEG(R)), and a concentration of carboxyl end groups (CEG(R)) with the AEG(R) being greater than the CEG(R), the chain extender compound having a concentration of lactam end groups (LEG) of at least about 10 equivalents per million grams of the reactant polyamide less than the AEG(R), for a duration of about 0.5 minutes to about 10 minutes, increasing the RV of the reactant polyamide;

forming a product, other than flake; and quenching the product to room temperature such that the product has a final RV greater than the starting RV and a concentration of amine end groups (AEG(P)) as defined by the formula:

$$AEG(P) = \{AEG(R) - LEG\} \pm X$$

wherein:

AEG(P) is the concentration of amine end groups in the quenched product in units of equivalents/1,000,000 gms of the product;

AEG(R) is the concentration of amine end groups in the reactant polyamide in units of equivalents/1,000,000 gms of the reactant polyamide;

LEG is the concentration of lactam end groups in the chain extender compound in units of equivalents/1,000,000 gms of the reactant polyamide; and X is any number in a range of about 0 to about 5.

2. The process of claim 1, wherein X is any number in a range of about 0 to about 2.

3. The process of claim 1, wherein the chain extender compound is selected from the group consisting of bis-N-acyl bis-caprolactam compounds and mixtures thereof.

4. The process of claim 1, wherein the chain extender compound is selected from the group consisting of isophthaloyl bis-caprolactam (IBC), adipoyl bis-caprolactam (ABC), terphthaloyl bis-caprolactam (TBC), and mixtures thereof.

5. The process of claim 1, wherein the polyamide is selected from the group consisting of poly(hexamethylene adipamide) homopolymer, poly(e-caproamide) homopolymer, polydodecanolactam homopolymer, poly(tetramethyleneadipamide) homopolymer, poly(hexamethylene sebacamide) homopolymer, the polyamide of n-dodecanedioic acid and hexamethylenediamine homopolymer, the polyamide of dodecamethylenediamine and n-dodecanedioic acid homopolymer, copolymers thereof, and mixtures thereof.

6. The process of claim 1, wherein the forming step comprises spinning the polyamide to form the product which is at least one filament.

7. A product made by the process of:

contacting reactant polyamide and a chain extender compound selected from the group consisting of bis-N-acyl bislactam compounds and mixtures thereof, both in a liquid phase, the reactant polyamide having a starting RV, a concentration of amine end groups (AEG(R)), and a concentration of carboxyl end groups (CEG(R)) with the AEG(R) being greater than the CEG(R), the chain extender compound having a concentration of lactam end groups (LEG) of at least about 10 equivalents per million grams of the reactant polyamide less than the AEG(R), for a duration of about 0.5 minutes to about 10 minutes, increasing the RV of the reactant polyamide;

forming the product, other than flake; and quenching the product to room temperature such that the product has a final RV greater than the starting RV and a concentration of amine end groups (AEG(P)) as defined by the formula:

$$AEG(P) = \{AEG(R) - LEG\} \pm X$$

wherein:

AEG(P) is the concentration of amine end groups in the quenched product in units of equivalents/1,000,000 gms of the product;

AEG(R) is the concentration of amine end groups in the reactant polyamide in units of equivalents/1,000,000 gms of the reactant polyamide;

LEG is the concentration of lactam end groups in the chain extender compound in units of equivalents/1,000,000 gms of the reactant polyamide; and X is any number in a range of about 0 to about 5.

8. A filament, comprising:
a synthetic melt spun polymer including:
polyamide repeating units ($R_1$);
polyamide chain extender moieties ($R_2$), each independently, selected from the group consisting of bis-N-acyl bislactam moieties; and
terminal groups ($R_3$), each independently, selected from the group consisting of a hydrogen atom and a hydroxyl group;
the polymer including chains, each independently, having a chemical structure:

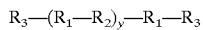

$$R_3-(R_1-R_2)_y-R_1-R_3$$

wherein
y is an integer of 1–7; and
the filament has a formic acid relative viscosity of at least about 30.

9. The filament of claim 8, wherein $R_1$, each independently, is selected from the group consisting of
(i) $-\{CO(CH_2)_k-CONH-(CH_2)_m NH\}_n-$, where k and m, each independently, is an integer of 1–12, and n is an integer of 10–140, and
(ii) $-\{NH(CH_2)_x-CO\}_z-$ where x is an integer of 1–12 and z is an integer of 20–280.

10. The filament of claim 8, wherein $R_2$, each independently, is selected from the group consisting of bis-N-acyl bis-caprolactam moieties.

11. The filament of claim 8, wherein $R_2$, each independently, is selected from the group consisting of an isophthaloyl bis-caprolactam (IBC) moiety, an adipoyl bis-caprolactam (ABC) moiety, and a terphthaloyl bis-caprolactam (TBC) moiety.

* * * * *